A. W. BACHMANN.
UNION FERRULE.
APPLICATION FILED MAR. 27, 1919.

1,352,342.  Patented Sept. 7, 1920.

WITNESSES
Howard D. Orr
F. T. Chapman.

Albert W. Bachmann, INVENTOR,
BY
E. G. Siggers.
ATTORNEY

UNITED STATES PATENT OFFICE.

ALBERT W. BACHMANN, OF LAPORTE, INDIANA.

UNION-FERRULE.

1,352,342.  Specification of Letters Patent.  Patented Sept. 7, 1920.

Application filed March 27, 1919. Serial No. 285,435.

*To all whom it may concern:*

Be it known that I, ALBERT W. BACHMANN, a citizen of the United States, residing at Laporte, in the county of Laporte and State of Indiana, have invented a new and useful Union-Ferrule, of which the following is a specification.

This invention has reference to union ferrules, and its object is to provide a union or coupling whereby lead pipe may be connected to iron or steel pipe expeditiously without soldering or wiping.

In accordance with the invention, there is provided a ferrule which may be secured to the end of the iron pipe, which term iron is intended to cover steel, and the ferrule is so constructed that with a nut of suitable shape and by the interposition of an antifriction ring or sleeve between the nut and lead pipe to be connected to the ferrule, a watertight joint may be produced by simply screwing the nut on that end of the ferrule shaped to receive the lead pipe.

The ferrule at the end remote from the iron pipe is formed with a nipple having a convex exterior surface and the nut, which latter may be of brass, is suitably shaped on the interior to present a convex surface toward the convex exterior of the nipple, the two surfaces being suitably related to receive the flared end of a lead pipe between them with the friction sleeve between the lead pipe and the nut, whereby to prevent disturbance of the lead pipe by the act of screwing the nut tight. The invention provides a water-tight joint produced and maintained without exertion of excessive pressure, and one which will yield to laterally exerted distorting forces tending to move the pipes out of line, without affecting the tightness of the joint or injuring the lead.

The invention will be best understood from a consideration of the following detailed description taken in connection with the accompanying drawing forming part of this specification, with the understanding, however, that the invention is not confined to any strict conformity with the showing of the drawing, but may be changed and modified so long as such changes and modifications mark no material departure from the salient features of the invention as expressed in the appended claims.

In the drawing:—

Figure 4:
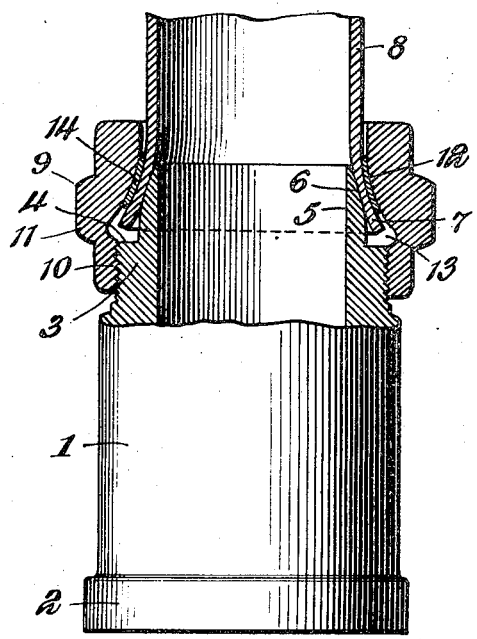
Fig. 4 is a view partly in longitudinal diametric section and partly in elevation of the assembled ferrule, with the lead pipe clamped in place.

Referring to the drawing, there is shown in Fig. 4 a ferrule 1 of which one end 2 is designed to be attached to an iron or steel pipe, while the other end is exteriorly threaded, as shown at 3, and beyond the threaded end has a recessed or shouldered portion 4 with a continuation 5 of exteriorly reduced diameter and constituting a nipple having its exterior surface conoidal or convex as indicated at 6. It is to the nipple 5 that one end 7 of a lead pipe 8 is attached in the finished joint. The end 7 is flared by suitable means such as are ordinarily employed by plumbers, and the flared end is applied to the nipple 5 so that the latter telescopes into said flared end. It is advisable to have the lead pipe stop short of the shoulder 4.

In order to hold the lead pipe onto the nipple 5 there is provided a nut 9 having an interiorly threaded end 10 for application to the threaded end 3 of the ferrule 1. The nut 9 is considerably longer axially than the threaded end 10 and has an exterior tool-receiving portion 11 which may be of customary hexagonal shape. The interior of the nut beyond the threaded end 10 is convexly rounded, as shown at 12, the convex portion terminating in an interior circumferential groove 13 merging into the corresponding portion of the threaded end 10 of the nut.

Applied to the lead pipe 8 between the nut 9 and the end of the lead tube to be applied to the nipple 5 is a thin sleeve 14 of suitable metal and this sleeve is exteriorly concave and interiorly convex so as to match the convexity of the surface 12 and bear against the outer surface of the flared end of the tube 8. When the parts are brought together the sleeve 14 lodges against the outer face of the flared end 7 of the lead pipe 8 and the surface 12 of the nut 9 bears against the outer concave face of the sleeve. As the nut is screwed onto the threaded end 3 of the ferrule 1 the inner surface of the flared end 7 of the lead pipe 8 is forced tightly against the convex outer face of the nipple 5. By this means the lead pipe is made to conform to the ferrule because of the ductility of lead, and, consequently, a considerable extent of bearing surface is provided making the joint water-tight under moderate pressure even when the nut is screwed up by the aid of the hand only. The sleeve 14 relieves the lead pipe from any dragging action thereon of the nut, which latter, of course, must be turned relative to the pipe when being screwed up tight. The application of a wrench to the nut causes sufficient force to be exerted to make the joint leak-proof even under considerable internal fluid pressure.

Figure 1:
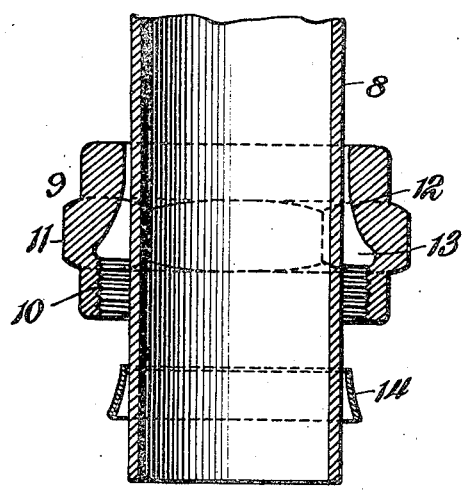
Figure 1 is a longitudinal diametric section of an assembly of lead pipe, nut and friction sleeve, with the nut and sleeve separated lengthwise of the pipe.
Figure 2:
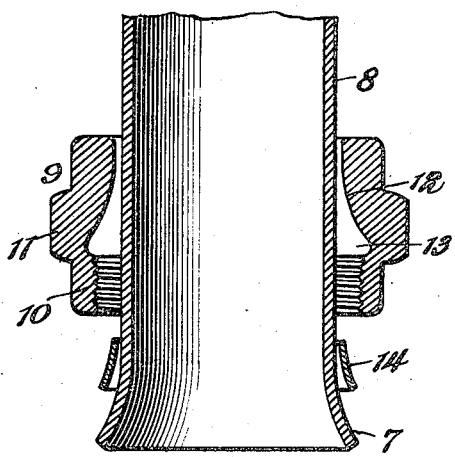
Fig. 2 is a similar view showing a subsequent step in the production of the joint where the end of the lead pipe is flared.
Figure 3:
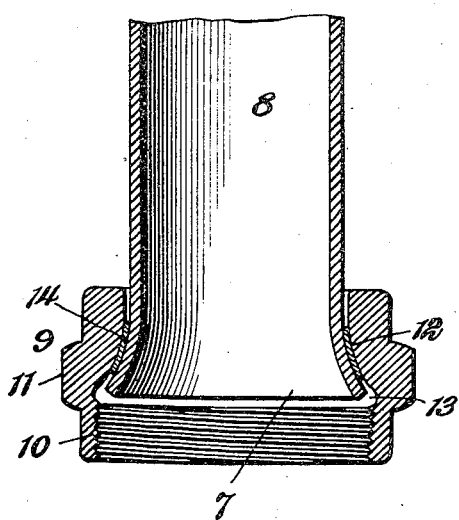
Fig. 3 is a view similar to Fig. 2 but showing the parts brought together, with the nut projecting beyond the flared end of the lead pipe.

In preparing the lead pipe for application to the nipple end of the iron ferrule the nut 9 and sleeve 14 are usually applied to the lead pipe in the order named, as shown in Fig. 1, and the lead pipe is then flared at the end, as shown in Fig. 2, to be applied to the nipple 5, and the nut 9 is brought against the sleeve 14 and the latter into engagement with the flared end of the pipe 8, as shown in Fig. 3. Then the structure, assembled as shown in Fig. 3, is applied to the ferrule, as shown in Fig. 4, with the nut screwed upon the threaded portion 3 of the ferrule as tightly as needed. The sleeve 14 readily conforms to the convex surface 12 of the nut and to the outer concave surface of the end 7 of the lead pipe 8. Because of the convexity of the nipple 5 where engaging the lead pipe the lead is forced or squeezed against such convex surface, partially embedding the outer convex surface of the nipple in the pipe, thus producing an especially effective joint resistant to fluid pressure and sufficiently flexible to yield to either initial out of line conditions or to distortions of the pipe line after the joint has been completed. Such conditions, however, do not affect the leak-proof nature of the joint and such distortions may occur to a considerable extent with the joint always completely tight.

The invention has the advantage in providing a ferrule of cast iron, or steel, or brass, which may be calked into the hub of a soil pipe fitting with oakum and melted lead in the customary manner. Of course, the ferrule may be suitably threaded to a pipe or fitting instead of employing the usual oakum and lead joint.

The nipple with the convex outer surface is advantageous in that its conoidal form imparts greater strength and allows more metal than a conical nipple and also operates to an extent as a ball joint connection.

The convex surface 12 is a ground surface to produce nicety of fit and this surface may be formed at the same time as the threaded portion 10. The sleeve or shield 14 may be made of brass or copper tubing or some other suitable material and prevents the nut from cutting or tearing the lead pipe when the nut is drawn up tight on the ferrule. Moreover, the lead pipe is protected by the shield where the inside of the nut presses it so that there is produced a rigid water-tight joint.

Of course, the connecting end of the lead pipe may be flared before the nut and sleeve or shield are applied, in which case the application of these parts must be made from the other end of the lead pipe.

The union ferrule of the invention is advantageous over other union ferrules or connections in that fewer parts are required and fewer operations are necessary in the manufacture of the ferrule so that it may be manufactured more expeditiously and at far less expense than ferrules previously proposed for the purpose. This is important since the ferrule may therefore be sold much more reasonably than other ferrules and such item is to be taken into consideration when making up estimates for installations or when buying material.

Not only does the union ferrule of the invention save time in making lead to iron connections without the use of solder but the connection is such that it may be used as a clean-out connection, whereby the pipes may be rodded out, in case of clogging or the like, by unscrewing the clamped connection and pulling it off to one side, thus giving free access to the clogged pipe to be cleaned, this being an exceptionally advantageous feature in waste pipe connections.

The convex outer surface 6 of the nipple 5 of the hard metal pipe 1 is elongated in the direction of the length of the pipe, the arc of curvature of the convex surface 6 having a radius, indicated at $6^a$, greater than half the inner diameter of the hard metal pipe or ferrule 1 or of the soft metal pipe 8. The result is that the nipple 5 is not only elongated but is relatively thin with the arc representing a relatively few degrees.

The convexly rounded inner surface 12 of the nut 9 is similarly shaped and is elongated in the direction of the length of the pipes 1 and 8 and represents but a few degrees, the curvature being on a radius $12^a$ of like length to that of the radius $6^a$ and otherwise the same as radius $6^a$, except that the center about which the arc is struck is outside of the pipes and of the nut 9. The inner diameter of the nut 9, at the end remote from the threaded end 10, is such as to admit the nipple 5, wherefore the lead pipe 8, when in place and clamped between the two convexly curved surfaces, has the clamping extended lengthwise of the pipe or ferrule and of the nut for so long a distance as to not only firmly grip the lead pipe but the gripping is nearly lengthwise of the pipe, thus thoroughly bracing the latter and preventing collapse or breaking thereof.

What is claimed is:—

1. A joint for connecting hard and soft metal pipes together, including a nipple extension of the hard metal pipe for entering one end of the soft metal pipe, said nipple extension having relatively thin walls elongated in the direction of the length of the pipe and having an acute exterior curved taper, and a nut for application to the hard metal pipe in embracing relation to the nipple and the soft metal pipe applied thereto, the said nut having a correspondingly elongated interior convexly rounded surface for location opposite and shaped to receive the convexly rounded longitudinally elongated outer surface of the nipple, whereby the soft metal pipe is grasped between the two convex surfaces for a distance lengthwise of the nipple and nut.

2. A joint for connecting hard and soft metal pipes, including an elongated relatively thin nipple extension of the hard metal pipe having a conoidal acute taper on its exterior surface and entering one end of the soft metal pipe, and a nut for application to the soft metal pipe in surrounding and receiving relation to the pipe and nipple entering it, the opposite surfaces of the nipple and nut being reversely convex and elongated in the direction of the length of the joint, whereby the nipple and nut have a longitudinally extended gripping engagement with the soft metal pipe.

3. A pipe joint comprising a hard metal pipe or ferrule with an exteriorly threaded end portion and a nipple projecting axially therefrom, the outer surface of the nipple being of elongated conoidal shape tapering exteriorly to a relatively acute edge and having its outer surface curved on a radius in excess of one half of the inner diameter of the ferrule and adapted to enter a soft metal pipe applied to the nipple, and a nut for application to the threaded end of the ferrule in encircling relation to the soft metal pipe where applied to the nipple, said nut having an inner conoidal surface elongated in the direction of the length of the nut, with the surface curved on a radius greater than one half the inner diameter of the ferrule, the opposed convexly curved surfaces being such as to prolong the gripping of the soft metal pipe lengthwise thereof to produce an extended gripping surface and thereby permit the production of a tight joint with the exertion of but relatively small force.

4. A pipe joint comprising a hard metal pipe or ferrule with an exteriorly threaded end portion and a nipple projecting axially therefrom, the outer surface of the nipple being of elongated conoidal shape tapering exteriorly to a relatively acute edge and having its outer surface curved on a radius in excess of one half of the inner diameter of the ferrule and adapted to enter a soft metal pipe applied to the nipple, and a nut for application to the threaded end of the ferrule in encircling relation to the soft metal pipe where applied to the nipple, said nut having an inner conoidal surface elongated in the direction of the length of the nut with the surface curved on a radius greater than one half the inner diameter of the ferrule, the opposed convexly curved surfaces being such as to prolong the gripping of the soft metal pipe lengthwise thereof to produce an extended gripping surface and thereby permit the production of a tight joint with the exertion of but relatively small force, the inner curved surface of the nut being ground, and the joint being provided with a thin tubular sleeve or shield interposed between the soft metal pipe, where interiorly engaged by the nipple, and the ground inner curved surface of the nut.

In testimony that I claim the foregoing as my own, I have hereto affixed my signature.

ALBERT W. BACHMANN.

Witnesses:
ETTA L. THOMAS,
H. W. SALLWASSER.